United States Patent [19]
Mitts

[11] Patent Number: 6,015,253
[45] Date of Patent: Jan. 18, 2000

[54] MULTIPLE WASHER NUT AND METHOD OF MAKING

[75] Inventor: Richard K. Mitts, Fullerton, Calif.

[73] Assignee: Illinois Tool Works Inc., Glenview, Ill.

[21] Appl. No.: 09/199,547

[22] Filed: Nov. 25, 1998

[51] Int. Cl.[7] .............................. F16B 37/08; F16B 39/02
[52] U.S. Cl. .................... 411/432; 411/433; 411/937.2
[58] Field of Search .................................. 411/222, 375, 411/432, 433, 937.2, 290, 291

[56] References Cited

U.S. PATENT DOCUMENTS

| | | | |
|---|---|---|---|
| 4,930,962 | 6/1990 | Reynolds | 411/432 X |
| 5,017,079 | 5/1991 | Reynolds | 411/432 |
| 5,049,017 | 9/1991 | Reynolds | 411/432 |
| 5,700,121 | 12/1997 | Minola | 411/432 |

*Primary Examiner*—Neill Wilson
*Attorney, Agent, or Firm*—George J. Netter

[57] ABSTRACT

A cage (28) constructed from a metal blank 26 for encompassing a plurality of nested conical washers (43) having a common threaded bore to form a nut (28). The cage side walls are free of separable openings (22) that would result in relaxation ("blossoming") of nut parts during nut tempering causing undesirable separation and misalignment of the nut threads.

10 Claims, 2 Drawing Sheets

MULTIPLE WASHER NUT AND METHOD OF MAKING

BACKGROUND

1. Background of the Invention

The present invention relates generally to a multiple-washer nut and, more particularly, to such a nut having a cage for retaining the washers in a tight unitary configuration throughout heat treatment and high tensile use.

2. Description of Related Art

A well received nut construction which provides for self-locking capabilities as well as relatively uniform distribution of load on the nut threads consists of a plurality of conical washers or Belleville washers arranged in stacked relation with their individual openings forming a continuous bore therethrough. A metal enclosure or cage secures the washers in unitary relation. The bore is threaded in conventional manner enabling receipt of a similarly threaded bolt therein. In use, when the multiple washer nut is received on a bolt and brought into pressure contacting relationship with another object (e.g., vehicle wheel) the nut is placed in tension causing the washers to flatten out from their original conical shape and producing a locking action with respect to the bolt. A more detailed description of such a nut can be found in U.S. Pat. No. 4,383,787, FREE SPINNING LAMINATED NUT WITH AUTOMATIC LOCK, by Richard L. Reynolds.

It is a general industry accepted practice as specified both in Society of Automotive Engineers (SAE) and IFI industry requirements that nut strength shear characteristics must exceed bolt tensile strength in order that the failure mode is bolt breakage in all cases. Also, the various nut components including the washers and unitizing outer cage are constructed of a heat treated spring steel. Specifically, soft metal washers are initially stacked and received within a soft outer cage, and final heat tempering is provided after threading.

However, it has been found in a significant percentage of cases, that the outer cage encompassing the nut washers tends to relax its gripping action about the washers during heat treatment which undesirable result is frequently referred to as "blossoming". Such relaxation of the cage with respect to the enclosed washers is deleterious in that it reduces the total amount of shear strength of the nut, as well as producing a shift or misalignment of nut thread pitch which can make bolt installation difficult. Also, where a nut cage has been found to experience a certain amount of blossoming during heat treatment, it also can exhibit further blossoming when in use and exposed to high tensile force with increased deleterious results.

SUMMARY OF THE INVENTION

In accordance with the present invention there is provided a multiple washer nut having a cage which acts to reduce the possibility of cage separation from the washers ("blossoming") during heat treatment as well as later when the nut is exposed to tensile forces during actual use. The cage is preferably draw-formed into generally cylindrical shape with a continuous sidewall, except for several heat relief openings, that conforms to the washer stack outer edges and extends upwardly from the lowermost washer to terminate adjacent the uppermost washer. Also, the cage upper edge includes a set of locking tabs located one at each nut corner, which in final assembly are bent over the corner onto the top of the uppermost washer.

In a further embodiment, the washer stack is constructed of metal of different initial hardness characteristics from those of the cage so that tempering can be accomplished without the need of heat release openings in the cage sidewall.

BRIEF DESCRIPTION OF THE DRAWING

The ensuing detailed description of the invention can be more readily appreciated and understood by reference to the accompanying drawing in which there are provided thy following figures.

DESCRIPTION OF PREFERRED EMBODIMENTS

Figure 1:
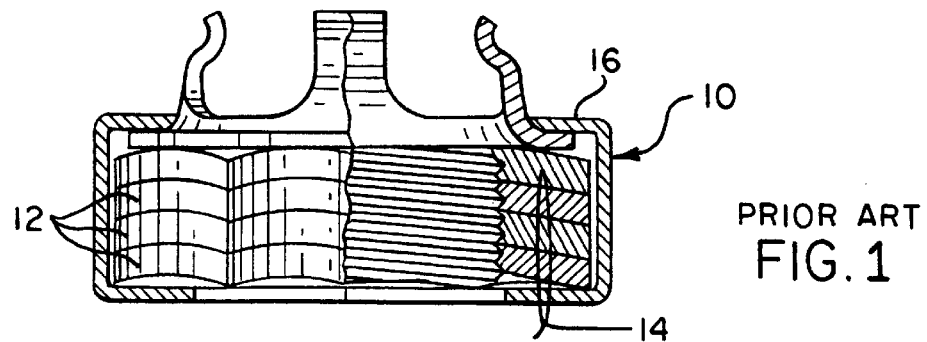
FIG. 1 is a perspective, partially fragmentary view of a prior art multiple-washer nut.
Figure 2:
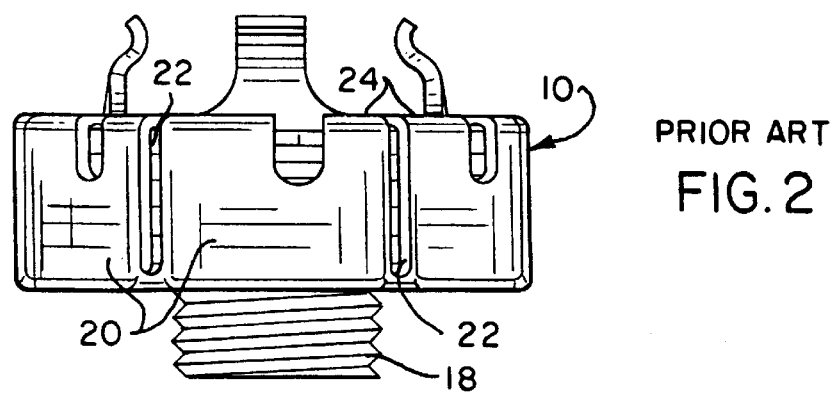
FIG. 2 is a side elevational view of the nut of FIG. 1.

For the ensuing description of a multiple-washer nut 10 of the prior art of a kind that we are primarily concerned with here, simultaneous reference is made to FIGS. 1 and 2. The nut includes a plurality of Belleville or conical washers 12 nested together into a stack with the central openings of the washers aligned to form a nut bore 14. A metal cage 16 encompasses the washer stack holding them in a unitary construction. The nut bore 14 is threaded to enable receipt of a bolt 18 therein in conventional manner. When the nut is threaded onto the bolt to the extent it applies a force against an object, the washers flatten out producing an increased frictional engagement or locking action between the threads of the nut and those of the bolt.

A prior art multiple-washer nut is constructed by initially stacking conical "soft" (i.e., non-hardened) steel washers onto one another and unitarily clamping the washers together within a similarly soft steel cage. Next, the nut bore is threaded in conventional manner following which the washers and cage are heat tempered to desired hardness. The hardening step is necessary so that the nut will possess requisite strength and meet the further requirement that any failure of a nut-bolt combination will be solely by the bolt breaking.

FIG. 1 shows the general form of prior art cage employed with an equal number of separate flat side members 20 to accommodate the same number of sides for the resultant nut (e.g., six for a hexagonal nut). More particularly, in fabrication these side members are cut out and bent upwardly from a flat metal blank so as to conform to corresponding flat faces on the washers with adjacent side members 20 being separated by a longitudinally extending narrow slot 22 extending from the lowermost to the uppermost washer and coinciding with the nut corners 23. Integral upper end portions of each side member are formed into locking tabs 24 which are bent across the top of the uppermost washer between the slots 22 so as to contactingly engage the uppermost washer between each pair of nut corners 23.

The general method of making the prior art nut includes, in the order recited, stacking the soft steel washers 12 onto one another, forming the cage 16 about the washer stack, threading the washer stack bore, and heat treating the washers and encompassing cage to the desired hardness. It has been found that a cage of the kind shown in FIG. 1 will on occasion "blossom" outwardly away from the underlying washers increasing the width of the slots 22 and moving the tabs 24 slightly away from contact with the top washer. This blossoming produces either or both a shift and misalignment of the bore threads which can make a bolt installation difficult or impossible to achieve.

Figure 3:
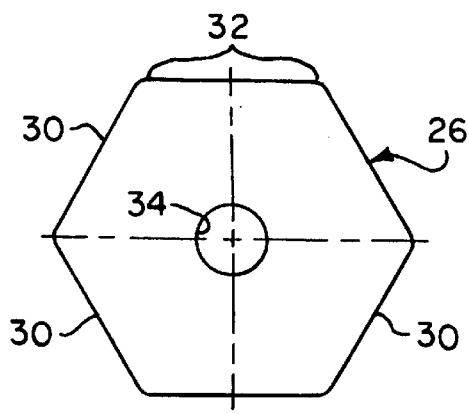
FIG. 3 is a blank from which the cage for the multiple-washer nut of the present invention is made.

Turning now to FIG. 3, there is shown in plan view a flat metal blank 26 for making a cage 28 of the present invention shown for use in making a nut of hexagonal geometry for illustration purposes only. More particularly, the blank is a flat metal sheet having six identical straight outer edge portions 30 arranged to form a regular hexagon. All edge points 32 are cut or trimmed off. A central opening 34 is also formed in the blank as the blank is being converted to the cage.

Figure 4:
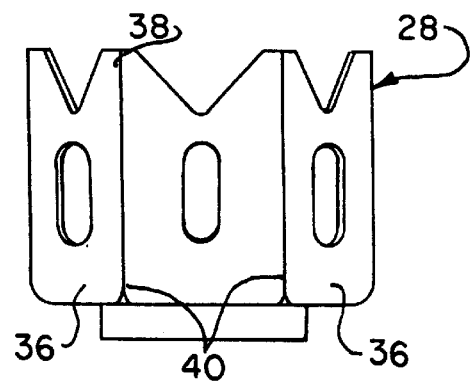
FIG. 4 is side elevational view of a cage for a multiple-washer nut of the present invention.
Figure 5:
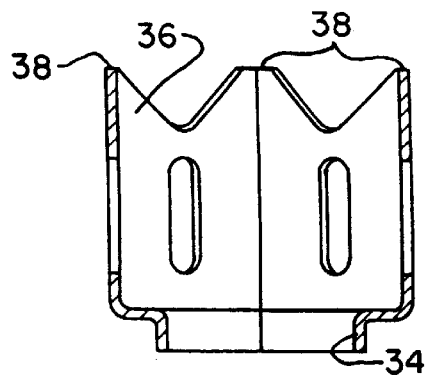
FIG. 5 is a side elevational, sectional view of the cage of FIG 4.
Figure 6:
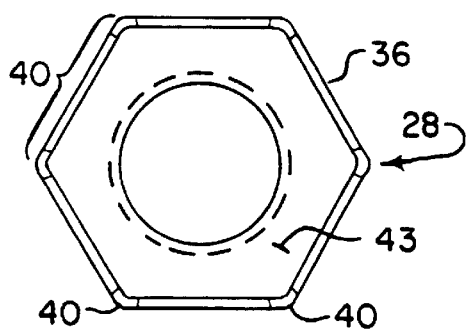
FIG. 6 is a top plan view of the cage of FIG. 4.

For the ensuing detailed description of the cage 28 construction, reference is made to FIGS. 4–6. Preferably by a progressive die or similar forming method, the blank is converted to a unitary elongated tube (FIGS. 4 and 5) with six identical sidewalls 36 which, when viewed in plan (FIG. 6), are seen to form a uniform hexagon. An individual triangular locking tab 38 extends upwardly from each sidewall and centered on each of the corner lines 40 between adjacent sidewalls. A heat release opening 42 is located substantially centrally of each sidewall to provide means for allowing escape of heat from the stack of washers 43 to achieve desired tempering.

Figure 7:
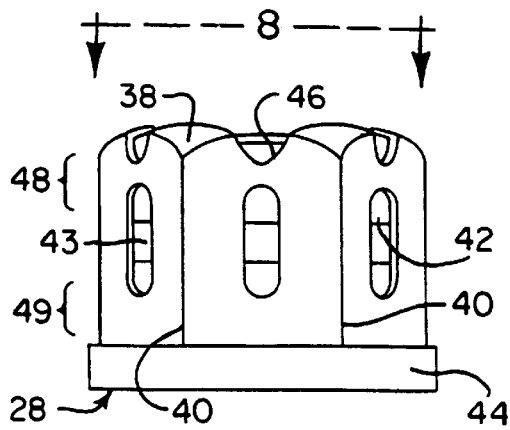
FIG. 7 is a side elevational view of an assembled multiple-washer nut of the present invention.

The wall portions adjacent the opening 34 are rolled over for receiving a compression washer 44 thereon in a frequent mode of use for multiple-washer nuts (FIG. 7).

In assembly, the stacked washers 43 are received within the cage 28, the tabs 38 are bent over contacting the uppermost washer, and the bore 46 is threaded in conventional manner. Finally, the assembled nut is heat treated.

Figure 8:
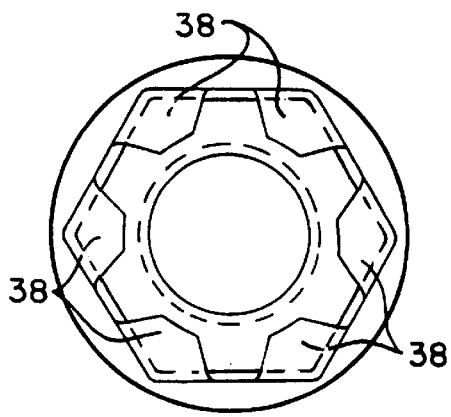
FIG. 8 is a top plan view of the nut of FIG. 7.

As shown in FIGS. 7 and 8, the cage has no separation lines such as the narrow slots 22 in the prior art cage which would enable the cage to relax ("blossom") relative to the washers during heat treatment and weaken the finished nut. In fact, there is a band 48 of imperforate metal above the heat release openings 42 as well as an imperforate band 49 below openings 42 which tightly encompass the washers 43. The presence of these bands have been found to prevent undesirable misalignment or shifting of the nut threads.

In a practical construction of the invention, the hexagonal washers 43 and load washer 44 were made of a relatively high carbon steel (4130) having a hardness characteristics of 35–45 Rockwell "C" and the cage blank pre-form 26 was made of a medium carbon steel (1050).

Figure 9:
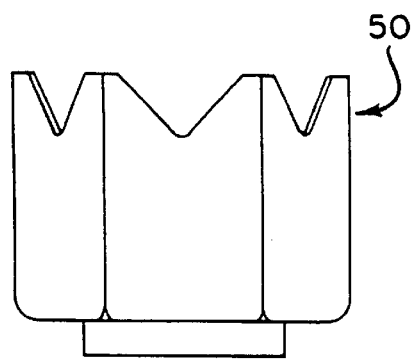
FIG. 9 is an elevational view of an alternative embodiment of cage of this invention.

For an alternative embodiment of the invention reference is made to FIG. 9. As shown there, a cage 50 is identically constructed to a cage 28 except that no heat release openings (such as openings 42) are provided the entire length of the cage sidewalls. This construction is only possible where the metal from which the washers are made can be tempered to the desired strength by the slower cooling resulting from the lack of heat relief or release openings.

Figure 10:
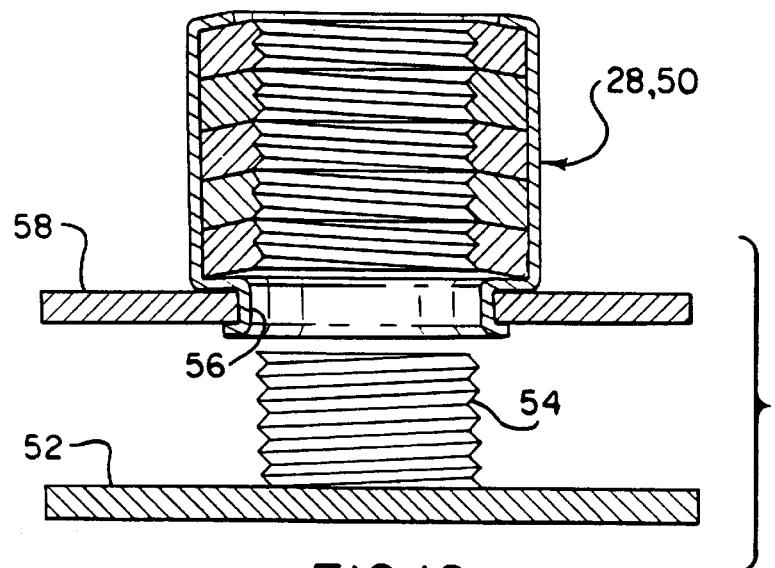
FIG. 10 is a sectional view of a nut of this invention employed in a pressure exerting mode of use.

FIG. 10 shows in sectional view a nut 52 provided with either cage 28 or 50 and specifically for applying pressure to an object 52 when the nut is threaded onto a bolt 54. With the nut generally assembled as previously described, lower edge parts of the cage are extended to provide a cylindrical flange 56 that is received within the opening of a pressure washer 58 and enlarged to lock the washer to the nut.

Although the present invention has been described in connection with a preferred embodiment, it is to be understood that those skilled in the art may provide modifications which come within the spirit of the invention as described and within the ambit of the appended claims.

I claim:

1. A cage for being received about a stack of washers to form a unitary nut having a given plurality of flat sides with adjacent sides being separated by a corner, comprising:

a one-piece hollow tubular metal body having a central bore of such dimensions and geometry as to receive he washer stack therein with the bore wall conformingly contacting the flat sides of the washers and a first end of the body being formed to reduce the bore cross-section so as to obstruct removal of the stack via said body first end;

at least one opening in a sidewall of the body spaced from both the body first and second ends sufficiently so as not to expose an outermost washer edge at said second end while exposing edges of several other washers and leaving an imperforate band of the body between said one opening and said second end extending continuously in a closed path about the central bore; and a plurality of tabs integral with the body and extending outwardly from the body second end onto the topmost washer of the stack.

2. A cage as in claim 1, in which each tab extends from the imperforate band onto the uppermost washer engaging an outermost surface of said washer adjacent a corner.

3. A cage as in claim 1, in which the cage body is made by a progressive forming operation on a single metal blank.

4. A unitizing cage constructed from a single metal blank for assembly about a plurality of stacked conical washers with polygonal edges to form a nut having a threaded bore and maintaining nut thread integrity throughout heat tempering after parts assembly, comprising:

a one-piece hollow metal tubular body including a cavity extending completely therethrough of such dimensions and geometry to receive the stacked washers therein a wall of the cavity being formed into polygonal sides matching the washer edges, and an imperforate side wall portion free from laterally separable slot openings grippingly securing outer edges of at least the upper several washers.

5. A unitizing cage as in claim 4, in which there is further provided a second imperforate side wall portion grippingly securing at least several of the lowermost washers in the stack, and a third side wall portion integrally interconnecting said first and second side wall portions.

6. A unitizing cage as in claim 5, in which said third side wall portion is imperforate.

7. A unitizing cage as in claim 5, in which said third side wall portion includes a plurality of heat release openings, one for each polygon side.

8. A unitizing cage as in claim 4, in which the washers are made of a relatively high carbon steel and the cage of a relatively low carbon steel.

9. A prefinished nut assembly which is resistant to relaxation separation of its parts on being subjected to heat hardening, comprising:

a nested stack of untempered, open-center, steel conical washers having the overall outer configuration of a polygon of a predetermined number of straight sides separated by corner edges;

an untempered hollow steel tube cage having a passage therethrough configured as a polygon and dimensioned to contactingly conform to the washer stack, the sidewall opposite the washer stack edges being imperforate; and portions of the cage tube body upper edge portions immediately opposite each washer stack corner being formed over and into contact with the outwardly directed surface of the uppermost washer.

10. A prefinished nut assembly which is resistant to relaxation separation of its parts on being subjected to heat hardening, comprising:

a nested stack of untempered, open-center, steel conical washers having the overall outer configuration of a polygon of a predetermined number of straight sides separated by corner edges;

an untempered hollow steel tube cage having a passage therethrough configured as a polygon and dimensioned to contactingly conform to the washer stack, the sidewall opposite the washer stack edges being imperforate except for selected portions opposite the uppermost washer;

said tube cage including a lower opening of the passage dimensioned to prevent the washer stack from being removed therethrough, tube walls adjacent the lower opening being formed into a deformable flange, a pressure washer with an opening fittingly received on the flange and secured in place by deformed parts of the flange; and portions of the cage tube body upper edge portions immediately opposite each washer stack corner being formed over and into contact with the outwardly directed surface of the uppermost washer.

\* \* \* \* \*